(12) United States Patent
Jansen et al.

(10) Patent No.: US 8,066,922 B2
(45) Date of Patent: Nov. 29, 2011

(54) METHOD AND DEVICE FOR THE PRODUCTION OF A PLASTIC PROFILE

(75) Inventors: Klaus Jansen, Buxtehude (DE); Dietmar Weidler, Bremervörde (DE); Marian Hoffmann, Bremervörde (DE)

(73) Assignee: Thomas GmbH + Co. Technik + Innovation KG, Bremervorde (DE)

( * ) Notice: Subject to any disclaimer, the term of this patent is extended or adjusted under 35 U.S.C. 154(b) by 0 days.

(21) Appl. No.: 12/296,821

(22) PCT Filed: Mar. 12, 2008

(86) PCT No.: PCT/EP2008/001954
§ 371 (c)(1),
(2), (4) Date: Oct. 10, 2008

(87) PCT Pub. No.: WO2008/116560
PCT Pub. Date: Oct. 2, 2008

(65) Prior Publication Data
US 2009/0206515 A1 Aug. 20, 2009

(30) Foreign Application Priority Data

Mar. 23, 2007 (DE) .................. 10 2007 014 578

(51) Int. Cl.
*D01D 5/30* (2006.01)
(52) U.S. Cl. .................. 264/172.11; 264/135; 156/441; 156/180; 156/66
(58) Field of Classification Search ............. 264/172.11, 264/135; 156/441, 180, 166
See application file for complete search history.

(56) References Cited

U.S. PATENT DOCUMENTS

| 3,873,399 A | 3/1975 | Goldsworthy |
| 5,127,980 A * | 7/1992 | Cavin ............................ 156/441 |

FOREIGN PATENT DOCUMENTS

| EP | 0 158 118 A | 10/1985 |
| FR | 2 256 656 A | 7/1975 |
| FR | 2 561 167 A | 9/1985 |

OTHER PUBLICATIONS

International Search Report (PCT/EP2008/001954).

\* cited by examiner

*Primary Examiner* — Joseph Del Sole
*Assistant Examiner* — David N Brown, II
(74) *Attorney, Agent, or Firm* — Laurence P. Colton; Smith Risley Tempel Santos LLC (57) ABSTRACT

In the production of elongate plastic profiles (10), which usually takes place by the pultrusion process, the cured plastic profile (10) emerging from a die (14) is pulled through the stationary die (14) by a take-off device. This process only makes it possible to produce straight plastic profiles (10). The invention envisages producing curved plastic profiles (10) by using a die (14) corresponding to the curvature of the plastic profile (10). For moving the cured part of the plastic profile (10) out of the die (14), it is provided that the die (14) is moved back step by step in relation to the stationary plastic profile (10) counter to the direction of production (19). In order that the plastic profile (10) remains stationary in relation to the die (14) as this takes place, it is securely held outside the die (14) by a holding means (20) during the moving back of the die (14).

12 Claims, 5 Drawing Sheets

METHOD AND DEVICE FOR THE PRODUCTION OF A PLASTIC PROFILE

STATEMENT OF RELATED APPLICATIONS

This application is the U.S. National phase Under Chapter II of the Patent Cooperation Treaty (PCT) of PCT International Application No. PCT/EP2008/001954 having a filing date of 12 Mar. 2008, which claims priority on German Patent Application No. 10 2007 014 578.2 having a filing date of 23 Mar. 2007.

BACKGROUND OF THE INVENTION

1. Technical Field

The invention relates to a process for producing a plastic profile, a continuous reinforcement comprising strands, woven fabrics and/or the like being led through a die and embedded in the plastic in the die, and to an apparatus for producing a plastic profile, comprising a die, in which a continuous reinforcement of the plastic profile can be embedded in liquid plastic.

2. Related Art

Straight plastic profiles comprising plastic and a continuous reinforcement of fibers, woven and/or knitted fabrics, which are embedded in the plastic, are mostly produced continuously in a strand. This usually takes place by the pultrusion process. For this purpose, the at least one strand is led through a die. In the die, the strand is provided with liquid plastic, which subsequently cures in the die. The cured plastic profile leaving the die is pulled through the die by a take-off device arranged in front of the die in the direction of production and thereby simultaneously transported away. The fact that the plastic profile is pulled through the die by the take-off device means that only straight plastic profiles can be formed by known processes of the type described, in particular by known pultrusion processes.

BRIEF SUMMARY OF THE INVENTION

The invention is therefore based on the object of providing a process and an apparatus for producing curved plastic profiles.

A process to achieve this object is a process for producing a plastic profile, a continuous reinforcement comprising strands, woven fabrics and/or the like being led through a die and embedded in the plastic in the die, characterized in that the die is periodically moved in relation to the stationary plastic profile. It is accordingly provided that the die is periodically moved in relation to the stationary plastic profile. Since the die is in any case adapted to the two- or three-dimensionally curved shape of the plastic profile, it can follow the curved shape of the plastic profile. The further moving of the die in relation to the plastic profile has the effect that a portion of the completed and cured plastic profile emerges from the die without the previous need for the plastic profile to be pulled through the die and thereby subjected to a tensile stress, which does not allow the forming of curved profiles, as in the prior art.

It is envisaged to securely hold the plastic profile, to be precise an already produced and adequately cured portion of the same, during the movement of the die, by for example at least one holding means. This allows the die to slide along the plastic profile and a relative movement to come about between the plastic profile that is stationary, as a result of being securely held, and the die that is moved with respect to it. In this way, portions of the plastic profile are produced virtually continuously and successive portions of the continuous plastic profile are progressively removed from the die.

It is also provided that the die is moved back and forth and thereby moves in one direction in relation to the stationary, that is held, plastic profile. Accordingly, the die performs a step-by-step movement. In successive steps, a newly produced portion of the plastic profile is thereby progressively pushed out of the die.

In the case of a preferred refinement of the process, a relative movement of the die in relation to the plastic profile takes place as soon as the location in which the plastic profile has cured is located in a rear region of the die. The rear region of the die refers to that region that lies opposite the end at which the plastic profile emerges from the die. By contrast, the front region refers to the region that lies at the end where the finished plastic profile emerges from the die. Once the location at which the plastic profile has cured has reached the rear end region of the die, the die is moved back counter to the direction of production of the plastic profile, until the location at which the plastic profile has cured is in the front region of the die. The die thus travels back in effect step by step on the finished plastic profile, to be precise in the direction of the reinforcement not yet enclosed or embedded by the plastic.

In terms of the process, it is preferably envisaged to provide the reinforcement running into the die at the rear end with plasticated plastic during the traveling back of the die on the stationary plastic profile and thereby embed the reinforcement in the plastic. In this way, the production of a further portion of the plastic profile simultaneously takes place during the moving back of the die.

The moving back and forth of the die has the effect that the location at which the plastic profile has cured migrates within the die from the rear end to the front end. During the subsequent stationary phase of the die, the portion of the plastic profile that is still located in the die cures increasingly, whereby the location of the cured plastic profile migrates again from the front end toward the rear end of the die.

According to a further refinement of the process, it is envisaged to bring the at least one holding means that securely holds the plastic profile in relation to the die when the latter is moved back out of contact with the plastic profile in phases in which the die is not moved. This allows the respective holding means to return to a starting position just in front of the die. The or each holding means can in this case move up to join the die, as it were, once the latter has been moved back on the plastic profile and thereby moved away from the respective holding means that keeps the plastic profile stationary during the moving back of the die.

A further refinement of the process envisages keeping the reinforcement, in particular strands of the same, taut during the relative movement of the die in relation to the plastic profile. This prevents the reinforcement from shifting or migrating within the plastic profile during the moving back of the die. The reinforcement is preferably drawn taut when the die is moved back in relation to the plastic profile, the die approaching the unwinding device of the reinforcement and it being possible in this case for the reinforcement to sag.

The drawing taut of the reinforcement may take place in various ways. On the one hand, in particular when it is formed by continuous strands, the reinforcement may be drawn taut by the strands or the reinforcement being subjected to a tensile stress, which is preferably of such a magnitude that it corresponds to the normal tensile stress of the strands during the production of the plastic profile, by braking or driving of the said unwinding device. On the other hand, the stress of the reinforcement may also be produced by clamping of the plastic profile at the rear end of the die, facing the unwinding device. The plastic profile is then held by the reinforcement at both ends of the die, so that the stress of the reinforcement, in particular of the strands, is kept constant within the die, which is what matters. This leads in particular during the moving forward of the die with the plastic profiles to a fixing of the reinforcement in the die, so that the reinforcement cannot migrate in the plastic profile during this movement.

An apparatus for achieving the object stated at the beginning is an apparatus for producing a plastic profile, comprising a die, in which a continuous reinforcement of the plastic profile can be embedded in liquid plastic, characterized in that the die can be moved along in relation to the plastic profile on the same. The ability of the die to move in relation to the plastic profile has the effect that a portion of the plastic profile emerges from the front end of the die without the plastic profile having to be pulled through the die. Rather, the die moves along on the plastic profile, a piece of newly produced plastic profile coming out from the front end of the die. In this way, the plastic profile is produced semi-discontinuously, that is to say virtually step by step, portion by portion.

Seen in the direction of production, at least one holding means is arranged in front of the die. This holds the portion of the plastic profile protruding from the front end of the die, in order that the plastic profile remains stationary and the die can be moved in relation to it, whereby a newly produced portion of the plastic profile is removed from the die, as it were, step by step.

According to a development of the apparatus, it is envisaged to provide the holding means with a releasable gripping or clamping mechanism for the finished plastic profile. The releasable gripping or clamping mechanism can securely hold the plastic profile when the die is intended to move in relation to the same; however, by releasing the gripping or clamping mechanism, the respective holding means can also be moved in relation to the plastic profile. In this way, step-by-step moving back of the holding means with respect to the plastic profile is also possible. As a result, after the moving back of the die counter to the direction of production of the plastic profile, while the or each holding means with the plastic profile held by it is stationary, the respective holding means can be moved back in front of the die. In this way, both the holding means and the die can perform step-by-step movements, to be precise both together and independently of each other, that is separately.

A further form of the apparatus envisages arranging at least the die, preferably also the respective holding means or all the holding means, on a carriage of its own in each case. In this way, the die and the holding means can be moved back and forth independently of one another step by step along the plastic profile. The different carriages for the die and the holding means or all the holding means are arranged in succession, seen in the direction of production, in the vicinity of the plastic profile, the carriage for the respective holding means being located in front of the front end of the die. Furthermore, independent controls are provided for the carriages of the die and of the at least one holding means. Each control means makes it possible to individually coordinate the movements of the die on the one hand and of the at least one holding means on the other hand, which are to some extent the same but also to some extent different.

According to an alternative form of the apparatus, it is envisaged to form the die and the at least one holding means as linked together. As a result, the at least one holding means is an integral part of the die. In order that the die and the at least one holding means can be displaced in relation to the plastic profile, it is envisaged to connect the at least one holding means movably to the die. This is preferably realized by an elastic region between the die and the holding means adjacent it. This elastic region has two functions. It connects the holding means to the die and it allows changing of the distance between the holding means and the die. If a number of holding means, for example two, are provided, they are also connected to one another by an elastic region which allows changing of the distance between two successive holding means. By drawing together and stretching out the elastic regions, the distance between the holding means and the die and also the distance between the holding means themselves can be changed for the step-by-step displacement of the die and/or each holding means with respect to the plastic profile.

The elastic regions are stretched and drawn together by actuators, which are preferably arranged between the die and the holding means and/or between the holding means. The actuators may be, for example, piezo stacks. These change their dimensions by corresponding electrical excitation, whereby the distances between the holding means and the die can be changed in a deliberately controlled manner, to be precise preferably periodically, by deformation of the elastic regions.

An advantageous development of the apparatus envisages forming the die from a number of die portions. The individual die portions are connected to one another by elastic intermediate portions to form a linked-together die. The holding means may also be connected to this die by elastic regions. Actuators are arranged in the regions of the elastic portions. The actuators that are consequently located between the intermediate portions serve at least for changing the distance between the intermediate portions. However, it is also conceivable to form the actuators in such a way that they change the direction of the intermediate portions. In this way, the shape of the die, in particular the angle of curvature of the same, can be changed in accordance with requirements, whereby plastic profiles having different shapes can be produced with the same die. As a result, virtually any desired plastic profiles can be produced with the same die, by using the actuators in the intermediate space between adjacent die portions to make the end faces of adjacent die portions deliberately run antiparallel to one another.

Further subclaims relate to preferred refinements and developments of the process according to the invention and of the apparatus.

BRIEF DESCRIPTION OF THE DRAWING FIGURES

Preferred exemplary embodiments of the invention are explained in more detail below on the basis of the drawing, in which.

DETAILED DESCRIPTION OF PREFERRED EMBODIMENTS

The figures schematically show an apparatus according to the invention, which also serves for carrying out the process according to the invention. This apparatus is a pultrusion apparatus for a plastic profile 10 with an internal reinforcement 11 and a plastic 12, preferably a thermoset, surrounding the latter. In the exemplary embodiment, which is only shown schematically, it is assumed that the reinforcement 11 comprises three endless strands 13 of preferably high-tensile fibers, for example carbon fibers. However, any other desired reinforcements, for example of woven and/or knitted fabrics or a combination of the strands 13 with woven and/or knitted fabrics, may also be embedded in the plastic 12 of the plastic profile 10. The invention is also not restricted to the three strands 13 that are shown in the figures.

With the schematically shown apparatus and the process according to the invention, plastic profiles 10 of any desired shape can be produced by pultrusion. Shown by way of example in the figures is a bent plastic profile 10, which is given a circular shape. The plastic profile 10 that is shown is bent in one plane. However, it is also conceivable to use the apparatus according to the invention and the process according to the invention to produce plastic profiles 10 that have a spatial (three-dimensional) shape.

The apparatus shown has a die 14, which corresponds to the arcuate shape of the plastic profile 10 to be produced. A longitudinal center axis of the die 14 is accordingly bent in precisely the same way as the plastic profile 10 to be produced, whereby the radius of the plastic profile 10 and that of the longitudinal center axis of the die 14 are the same. The die 14 is adapted to the curved shape of the plastic profile 10 which, in the exemplary embodiment shown, is similar to the shape of a portion of a circular ring. The length of the die 14 in the direction of the arcuate plastic profile 10 is dimensioned such that the location 17 of the curing of the plastic profile 10 in the die 14 that is schematically represented in the figures as a white circle can migrate over a certain distance in the die 14. This distance corresponds to a portion of the length of the plastic profile 10 that can be produced in each working cycle of the apparatus, explained in more detail further below, by the process according to the invention.

A rear end 15 of the die 14, that is the end through which the strands 13 for forming the reinforcement 11 run into the die 14 in the still raw state, that is the state in which they are not surrounded by the plastic 12, is assigned an unwinding device 16, which is schematically represented in the figures. This device takes up a certain supply of the reinforcement 11. In the exemplary embodiment shown, in which the reinforcement 11 is formed by three strands 13, at least three coils with a relatively great supply of a continuous strand 13 each are arranged on the unwinding device 16. The coils can be driven and/or are able to be braked, so that they always keep the strands 13 taut with a predeterminable stress.

Also provided in the region of the rear end 15, at which the strands 13 run into the die 14, is a device that is not shown in the figures for feeding liquid, in particular hot, plastic 12. As a result, liquid plastic 12 is fed right at the beginning of the die 14, in order to enclose the strands 13 with it. As time passes, the plastic 12 solidifies in the die 14 and thereby cures. The schematically represented location 17 at which the plastic profile 10 has cured migrates over time ever more toward the front end 18 of the die 14. At this front end 18, the cured plastic profile 10 also later emerges from the die.

Seen in the direction of production 19, a holding means 20 assigned to the plastic profile 10 is provided at a small distance in front of the front end 18 of the die 14. In the simplest case, this may be a gripper for releasably gripping the plastic profile 10. A holding means can grip the finished plastic profile 10 in the region located in front of the die 14 and hold it securely, but can also be released from the plastic profile 10. It is similarly conceivable to assign a further holding means to the rear end 15 of the die, facing the unwinding device 16, it being possible for this holding means to be arranged in front of the rear end 15 or else be integrated in the rear end 15 of the die 14.

Both the die 14 and the holding means 20 are respectively assigned a carriage of their own. These carriages are not shown in the figures. The carriages follow in succession in the direction of production 19, a carriage for the holding means 20 being located in front of the carriage of the die 14—seen in the direction of production 19. The carriages are formed in such a way that both the die 14 and the holding means 20 can be moved along on them, following the arcuate shape of the plastic profile 10. The carriages are provided with independent drives and have controls which allow independent movement.

In the case of more complex shapes of the plastic profile 10, in particular in the case of spatial, three-dimensionally bent plastic profiles 10, the paths of the carriages and the shape of the die 14 are correspondingly adapted. It is also conceivable to arrange both the die 14 and the holding means 20 on robot arms having a corresponding number of degrees of freedom or axes, whereby, as a result of correspondingly coordinated controls, the robots move the die 14 and the holding means 20 on any desired paths in accordance with the desired shape of the plastic profile 10 and it is thereby possible with such an apparatus to produce plastic profiles 10 of any desired shape, even a three-dimensional shape.

The process according to the invention is explained in more detail below by the example of producing an arcuate plastic profile 10.

Figure 1:
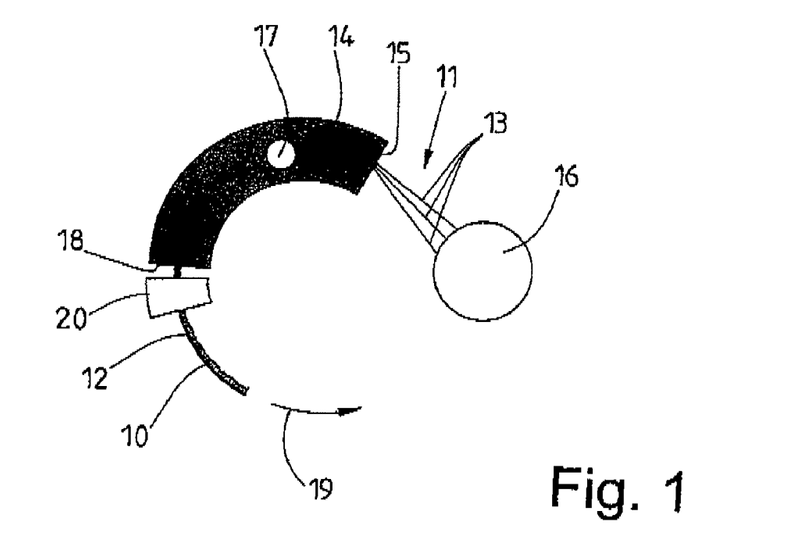
FIG. 1 shows a schematic view of a first exemplary embodiment of an apparatus according to the invention in a starting position.

FIG. 1 shows the starting position of the apparatus. The location 17 at which the plastic profile 10 has already cured in the die 14 is located here, in the vicinity of the rear end 15 of the die 14, facing the unwinding device 16, or to put it another way closer to the rear end 15 than to the front end 18 of the die 14. The rear end 15 of the die 14 is in this case adequately far away from the unwinding device 16. The holding means 20 is located a short distance in front of the front end 18 of the die 14. In this case, the holding means 20 can already securely clamp, and consequently securely hold, a finished portion of the plastic profile 10 protruding from the die 14.

From the starting position of FIG. 1, the die 14 is then moved back counter to the direction of production 19, the plastic profile 10 being securely held by the holding means 20, so that a relative movement of the die 14 in relation to the plastic profile 10 that is kept stationary comes about, the die 14 moving back on the plastic profile 10. The die 14 is in this case moved along on the carriage and guided by the latter on the arcuate path of the plastic profile 10. The die 14 thereby performs a movement about the center point of the arcuate longitudinal center axis of the plastic profile 10. When the die 14 moves back on the plastic profile 10, the rear end 15 of the die 14 approaches the unwinding device 16. Furthermore, the location 17 at which the plastic profile 10 has cured in the die 14 migrates forward in the direction of production 19 into the vicinity of the front end 18, though the location at which the plastic profile 10 has cured still remains in the die 14. The holding means 20 fixing the plastic profile 10 during the moving back of the die 14 remains in the starting position during the moving back of the die 14, whereby the relative movement of the die 14 with respect to the stationary plastic profile 10 that is essential for the invention is obtained when the die 14 moves back.

Figure 2:
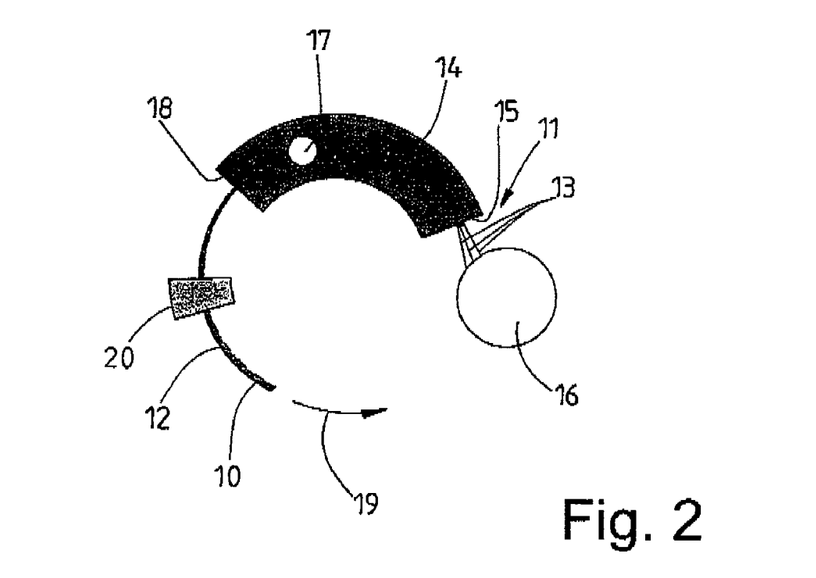
FIG. 2 shows the apparatus according to FIG. 1 after a first working step, which follows the starting position.

FIG. 2 shows that, when the die 14 moves back counter to the direction of production 19, the holding means 20 that is stationary during this time moves away from the front end 18 of the die 14, to be precise by the length of the plastic profile 10 that emerges through the front end 18 of the die 14 when the latter moves back.

It can be seen from FIG. 3 that the holding means 20 has subsequently been moved back again just in front of the front end 18 of the die 14. This takes place by the holding means 20 being decoupled from the plastic profile 10 in the position of the holding means 20 that is represented in FIG. 2, with the die 14 moved back completely. The holding means 20 then lets go, as it were, of the plastic profile 10. On the carriage for guiding the holding means 20, the latter is then moved back, without holding the plastic profile 10, in front of the front end 18 of the die 14, as shown in FIG. 3.

Figure 3:
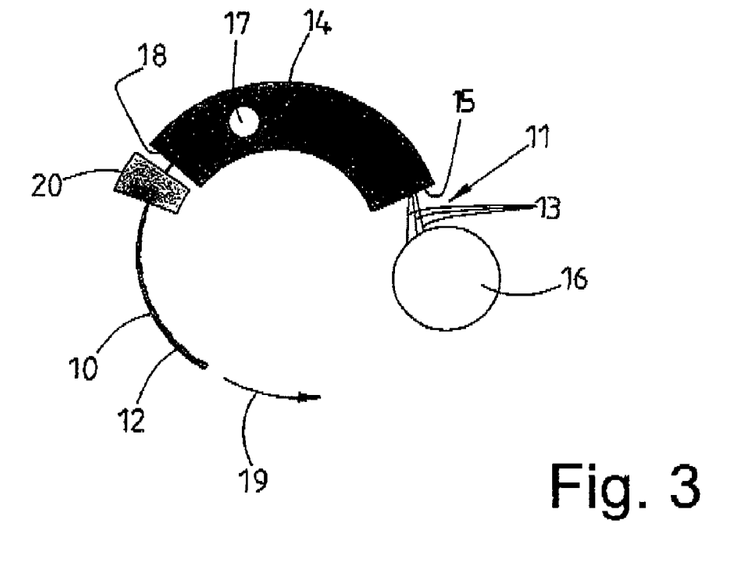
FIG. 3 shows the apparatus of FIGS. 1 and 2 after a second working step.
Figure 4:
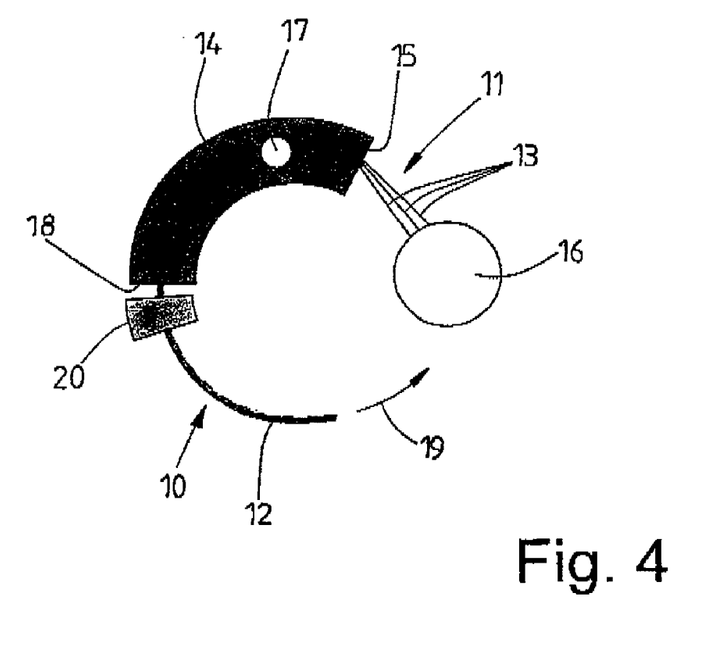
FIG. 4 shows the apparatus of FIG. 3 after a third working step.

In the further process step, which becomes clear by a comparison of FIGS. 3 and 4, the die 14 that has been brought up to the unwinding device 16 during the moving back on the plastic profile 10 is moved away again from the unwinding device 16, in that the die 14 is brought into the starting position according to FIG. 1. The procedure followed here is that the die 14 and the holding means 20 are together moved back into the starting position in the direction of production 19. As this takes place, the region of the plastic profile 10 protruding from the front end 18 of the die 14 is preferably gripped again by the holding means 20. Then, the plastic profile 10 is also moved along during the moving forward of the die 14 and the holding means 20, so that during this forward movement no relative movement takes place between the plastic profile 10 and the die 14 and the holding means 20.

Once the die 14 has been moved back along on the plastic profile 10 according to FIG. 2, and a newly produced portion of the plastic profile 10 has thereby been effectively removed from the die, the location 17 at which the plastic profile 10 has cured is in the vicinity of the front end 18 of the die 14. During the process steps which follow that, which are shown in FIGS. 3 and 4, that is during the return of the die 14 and the holding means 20 into the starting position of FIG. 1, the location at which the plastic profile 10 has cured in the die 14 migrates again counter to the direction of production 19 back in the direction of the rear end 15 of the die. This migrating back of the location 17 of the curing of the plastic profile 10 in the die 14 may, however, also take longer than the moving back of the apparatus into the starting position of FIG. 1. In this case, there is a pause in the cycle, before a portion of the plastic profile 10 that has been newly produced in the die 14 is removed from the die, again by the die 14 moving back on the plastic profile 10 from the starting position of the die 14 and the holding means 20.

During the production of the plastic profile 10 described above, it may be provided that the reinforcement 11 is kept taut in the plastic profile 10, at least during the moving of the die 14. This may take place by the unwinding device 16 exerting a corresponding stress on the strands 13 of the reinforcement 11, in particular during the movement of the die 14, by driving or braking. Alternatively or in addition, it may also be envisaged to keep the strands 13 of the reinforcement 11 taut only in the die 14. In this case, the rear end 15 of the die 14 is assigned a further holding means. This may be located outside the die 14 in front of the rear end 15, or else be integrated in the rear end 15 of the die 14.

The process according to the invention makes discontinuous, step-by-step production of the plastic profile 10 possible, successive pieces of a length that is dependent on the length of the profile channel for forming the plastic profile in the die 14 being continually produced. This determines the length of the distance that can be covered by the location 17 at which the plastic profile 10 has cured in the die 14, between the rear end 15 and the front end 18 of the die 14. The greater this distance, the longer the piece of the plastic profile 10 that can be produced discontinuously, that is step by step, in a working cycle (FIGS. 1 to 4).

Should it be necessary to compress the plastic profile 10 in the die 14 by an additional pressing operation, cure it and/or calibrate it, this can take place during the moving of the die 14 that is shown in FIGS. 1 to 4 with the holding means 20 in the direction of production 19.

FIGS. 5 to 8 show a second exemplary embodiment of the apparatus according to the invention. In the case of this apparatus, a die 21 is connected to two holding means 22 and 23. To the extent to which the apparatus coincides with that of FIGS. 1 to 4, the same designations are used for the same parts and items.

The holding means 22 and 23 are an integral part of the die 21. The holding means 22 and 23 are arranged in front of the front end 18 of the die 21. The holding means 22 following the front end 18 of the die 21 is connected in one piece to the die 21 by an elastic region 24 of reduced cross section. The adjacent holding means 22 and 23 are connected to one another by an elastic region 24 formed in the same way. The elastic regions 24 have a significantly smaller outside diameter than the die 21 and the holding means 22 and 23 of the same outside diameter. This has the effect of producing peripheral, annular intermediate spaces 25 between the front end 18 of the die 21 and the end face of the holding means 22 facing the latter and also between adjacent end faces of the holding means 22 and 23. Stretching or compressing of the elastic regions 24 allow the distances between the holding means 22 and 23 and between the holding means 22 and the die 21 to be changed in the regions of the intermediate spaces 25. This changing of the distances is performed by actuators 26, which in the exemplary embodiment shown are piezo stacks, which can be electrically changed in width. The actuators 26 are connected on the one hand to adjacent end faces of the holding means 22 and 23 arranged next to one another and on the other hand to the front end 18 of the die 21 and the end face of the holding means 22 that is facing the latter.

The holding means 22 and 23 have inside them clamping mechanisms 27 surrounding the plastic profile 10. These mechanisms may be formed in any way desired. In the exemplary embodiment shown, it is provided that the clamping mechanisms 27 also work piezoelectrically, in that they increase or decrease in diameter depending on the voltage applied, and as a result the holding means 22, 23 securely clamps on the outer circumference of the plastic profile 10 or comes away from the plastic profile 10.

Figure 5:
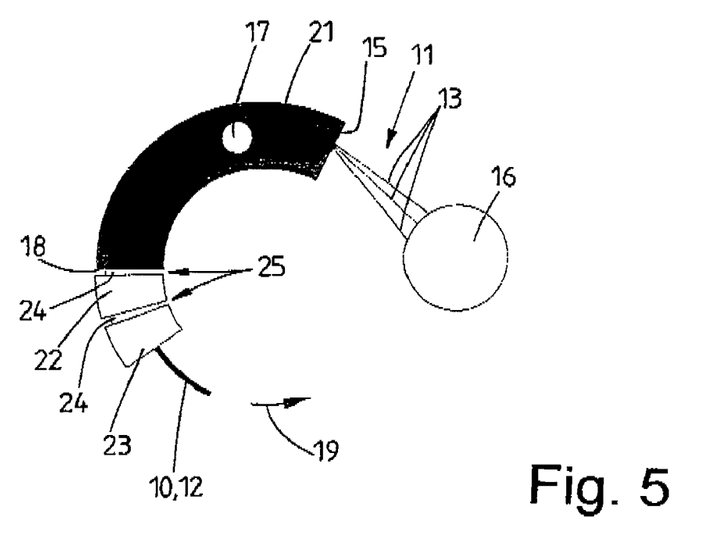
FIG. 5 shows a second exemplary embodiment of an apparatus according to the invention in a starting position.

The production of the plastic profile with the apparatus of FIGS. 5 to 8 is explained in more detail below:

FIG. 5 shows the starting position of the apparatus. Here, the location 17 at which the plastic profile 10 has already cured in the die 21 is in the vicinity of the rear end 15 of the die 21, facing the unwinding device 16. The holding means 22 and 23 have been moved together to the greatest extent and also moved up to the front end 18 of the die 21.

From the starting position of FIG. 5, the die 21 is then moved back counter to the direction of production 19, the plastic profile 10 being securely held at least by the holding means 23, so that a relative movement of the die 21 in relation to the plastic profile 10 that is kept stationary comes about, the die 21 moving back on the plastic profile 10. This moving back of the die 21 is induced by the actuator 26 stretching the elastic region 24 between the holding means 22 and the die 21, and consequently lengthening it. As a result of the secure clamping of at least one holding means 23 and/or 22 on the plastic profile 10, there is no change in the location of the holding means 22 and 23. During this moving back of the die 21 on the plastic profile 10, the rear end 15 of the die 21 approaches the unwinding device 16. Furthermore, the location 17 at which the plastic profile 10 has cured in the die 21 migrates forward in the die 21 in the direction of production 19, into the vicinity of the front end 18.

Figure 6:
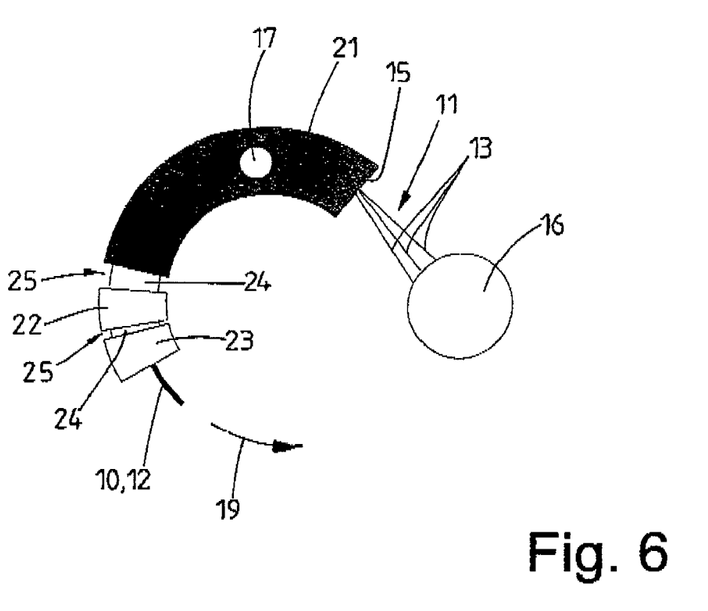
FIG. 6 shows the apparatus of FIG. 5 after a first working step.

FIG. 6 shows that, when the die 21 moves back counter to the direction of production 19, the holding means 22 and 23 that are stationary as it does so move away from the front end 18 of the die 21, to be precise by the length of the plastic profile 10 that emerges through the front end 18 during the moving back of the die 21.

Figure 7:
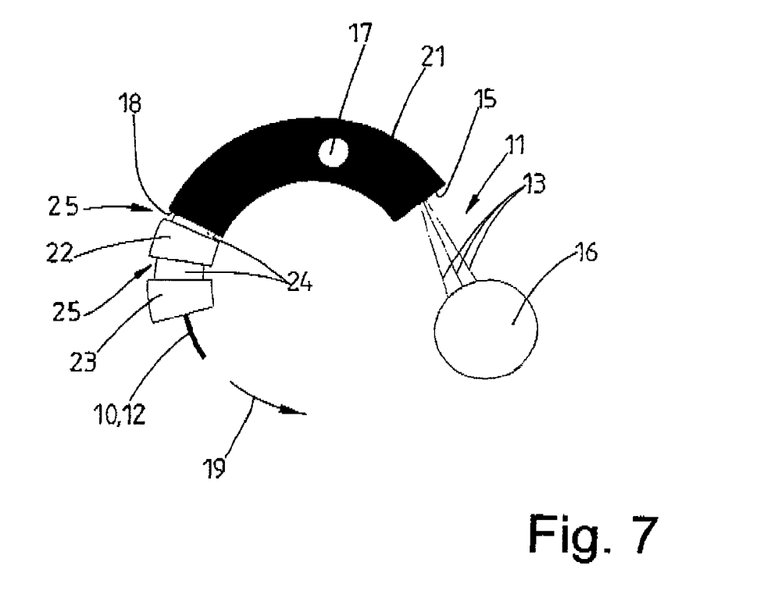
FIG. 7 shows the apparatus that is shown in FIGS. 5 and 6 after a second working step.

FIG. 7 shows the next process step, in which the holding means 22 facing the die 21 is moved again as far as possible up to the front end 18 of the die 21, so that the holding means 22 is again in the starting position shown in FIG. 5. For this purpose, the clamping of the holding means 22 on the plastic profile 10 has been released, that is the clamping mechanism 27 has been opened. On the other hand, the holding means 23 with the clamping mechanism 27 assigned to it is still securely clamped on the plastic profile 10, so that only the position of the holding means 22 changes, and not that of the holding means 23.

Once the holding means 22 has moved up to the die 21 according to FIG. 7, the die 21 and the holding means 22 are together moved forward in the direction of production 19, up to the holding means 23. In this case, the die 21 is moved away from the unwinding device 16 and the location 17 of the curing of the plastic profile 10 migrates again counter to the direction of production 19 back in the direction of the rear end 15 of the die 21. At the same time, a newly produced portion of the plastic profile 10 is thereby removed from the die, in that this portion is pushed out from the holding means 22 when the die 21 and the holding means 22 move forward in the direction of production 19. As this takes place, the clamping mechanism 27 of the holding means 23 is open, while the clamping mechanism 27 of the holding means 22 is closed. After the removal from the die of a newly produced portion of the plastic profile 10 by the moving forward of the die 21 and the holding means 22 right up to the holding means 23, the apparatus is back in the starting position of FIG. 5, so that after the procedure described above a new portion of the plastic profile 10 can be produced.

In all the working steps shown in FIGS. 5 to 7, the front holding means 23 does not change its position. The holding means 23 therefore always remains fixed in place. Only the holding means 22 and the die 21 periodically change their position, and consequently the distance from one another and/or together in relation to the holding means 23.

According to a development of the process, it is conceivable to use a die which is variable in curvature, preferably can be continuously changed. It is not necessary for the entire die to be variable in curvature, it is sufficient if the profile channel of the die forming the contour of a cross section of the plastic profile 10 is variable in shape, in particular curvature.

Figure 8:
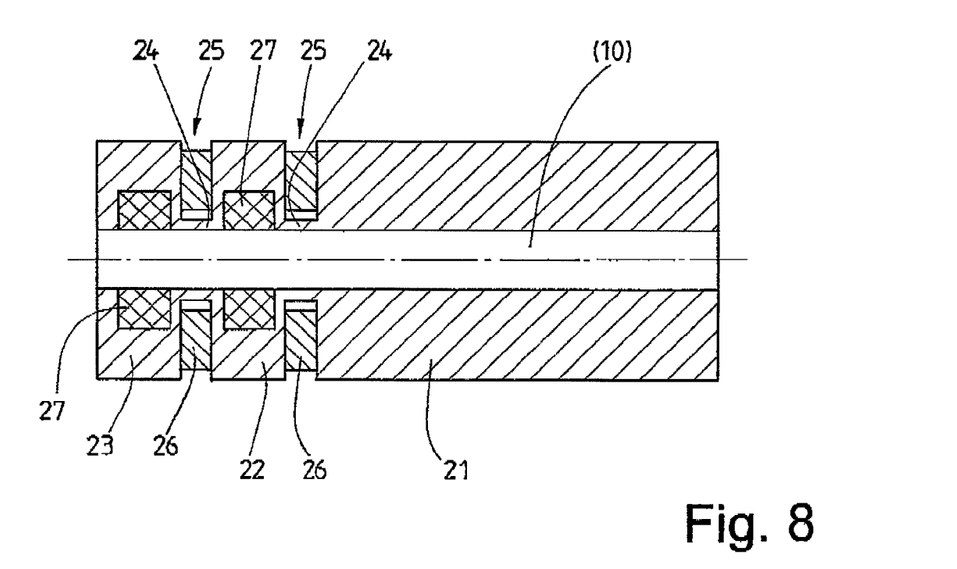
FIG. 8 shows a schematic longitudinal section through the apparatus of FIGS. 5 to 7.
Figure 9:
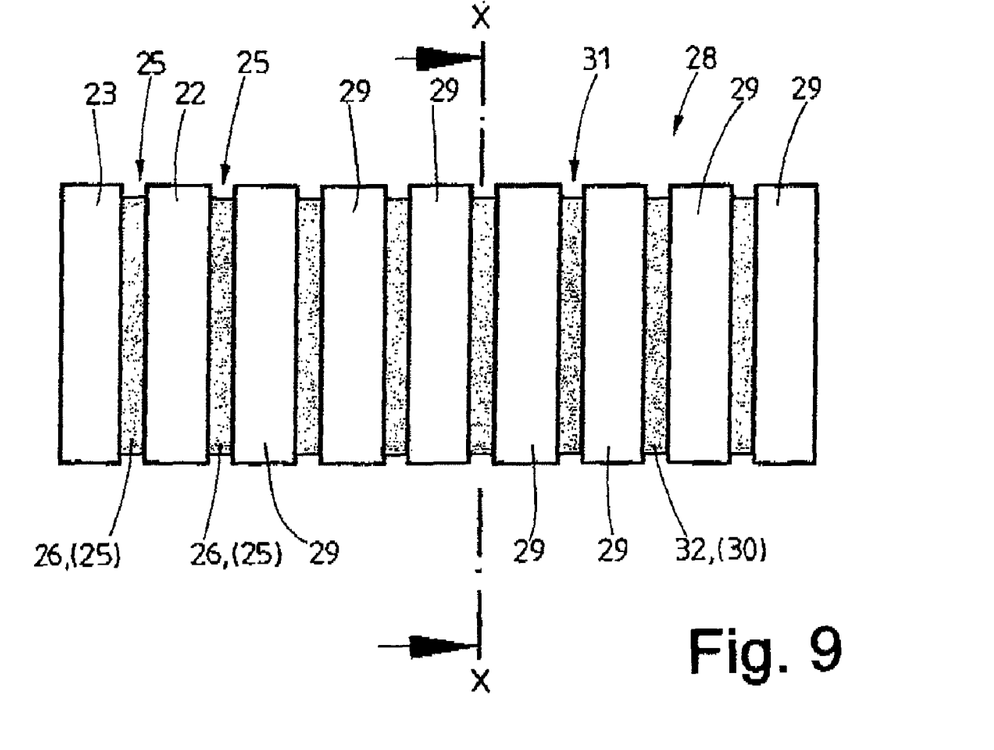
FIG. 9 shows a schematic side view of an apparatus according to a third exemplary embodiment of the invention.
Figure 10:
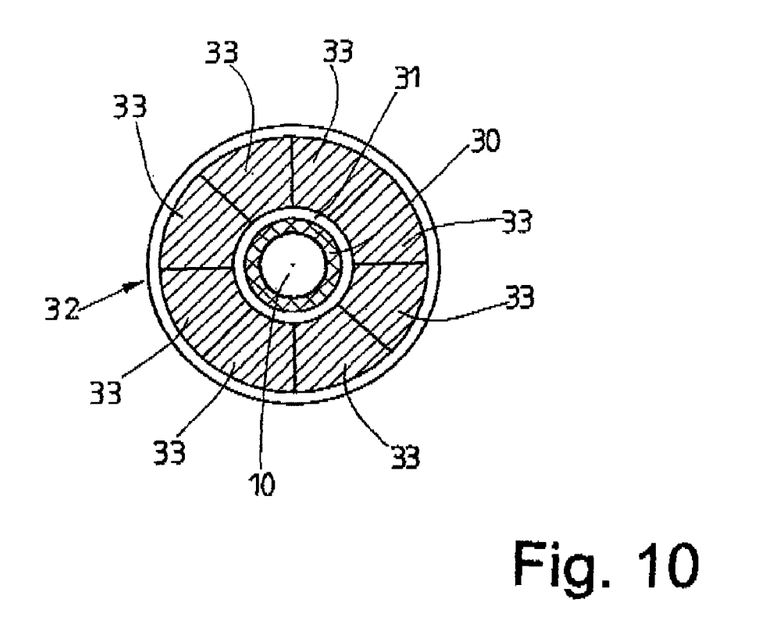
FIG. 10 shows a cross section X-X through the apparatus of FIG. 9.

FIGS. 9 and 10 show a development of the apparatus according to FIGS. 5 to 8. This apparatus differs from the apparatus described above by the die 28. The same designations are used for the same parts of the apparatus of FIGS. 5 to 8.

The die 28 is formed in such a way that it can be changed in curvature in any way desired. For this purpose, the die 28 is formed by a number of short die portions 29 lying one behind the other. These are preferably identically formed. Elastic portions 30 are arranged between the adjacent die portions 29. The elastic portions 30 connect the die portions 29 to form the altogether one-part die 28. Actuators 32 surrounding the elastic portions are provided in the intermediate spaces 31 between the die portions 29. In the same way as the actuators 26, these actuators can lengthen and shorten the elastic portions 30 between adjacent die portions 29 on the basis of the piezoelectric principle. Here, too, the front end 18 of the die 28 is followed by holding means 22 and 23. In the case of the die 28 that is shown, the die portions 29 are of the same length as the holding means 22 and 23. These are formed as shown in FIG. 8. By contrast with the holding means 22 and 23, the die portions 29 have no clamping mechanisms 27.

FIG. 10 shows the form of the actuators 32 for the deliberate changing of the curvature of the die 28. Accordingly, each actuator 32 is formed by a number of actuator segments 33 with the shape of segments of a circular ring. In the exemplary embodiment shown, eight identical actuator segments 33 are provided, although the number of actuator segments 33 may also be greater or smaller. It is possible by differently activating the actuator segments 33 for them to stretch more on one side than on the other side and, as a result, for the die portions 29 to tilt with respect to one another, so that the intermediate spaces 31 are of different widths. By dividing the actuator 32 into actuator segments 33, it is possible to change the curvature of the die 28 in any desired direction, in particular also to manipulate the dying into three-dimensional shapes.

An alternative refinement of the apparatus is also conceivable, one in which the plastic profile 10 is moved through the die by variations in thickness along the die. This refinement is suitable in particular for a plastic profile 10 comprising a plastic that does not shrink very much. The moving forward of the plastic profile 10 through the die by means of variations in thickness can be realized with the die 28 of individual die portions 29, the variations in thickness being brought about by periodic movements of the die portions 29 by means of the actuators 32, in that the die portions 29 move progressively or alternatingly forward or back in the direction of production 19 on the plastic profile 10. In the case of such transport of the plastic profile 10 through the die 28 that is brought about by variations in thickness of the die 28, it is possible to dispense with holding means 22 and 23.

The variations in thickness of the die 28 are realized by acoustic oscillations, which clamp the plastic profile 10 in the die 28 in certain portions, to be precise in such a way that some die portions 29 can move along freely on the plastic profile and other die portions 29 are securely held as a result of the variations in thickness.

LIST OF DESIGNATIONS 10 plastic profile
11 reinforcement
12 plastic
13 strand
14 die
15 rear end 16 unwinding device
17 location
18 front end
19 direction of production
20 holding means
21 die
22 holding means
23 holding means
24 elastic region
25 intermediate space
26 actuator
27 clamping mechanism
28 die
29 die portion
30 elastic portion
31 intermediate space
32 actuator
33 actuator segment

The invention claimed is:

1. A process for producing a plastic profile (10) comprising a continuous reinforcement (11) comprising strands (13), comprising:
   leading woven fabrics through a ring-shaped die (14; 21; 28);
   embedding the woven fabrics in a plastic (12) in the die (14; 21; 28) to form the plastic profile (10);
   holding the plastic profile (10) stationary relative to the die (14; 21; 28); and
   periodically moving the die (14; 21; 28) in relation to the stationary plastic profile (10) by periodically moving the die (14; 21; 28) on and along the formed shape of the plastic profile,
   wherein the periodic movement of the die (14; 21; 28) comprises a movement step in a direction of production (19) of the plastic profile (10) and a movement step counter to the direction of production (19) of the plastic profile (10).

2. The process as claimed in claim 1, wherein the periodic movement of the die (14; 21; 28) further comprises moving the die (14; 21; 28) back and forth discontinuously or step by step, whereby a relative movement of the die (14; 21; 28) in relation to the plastic profile (10) takes place during a backward movement of the die (14; 21; 28) counter to the direction of production (19).

3. The process as claimed in claim 1, further comprising:
   moving the die (14; 21; 28) back on the plastic profile (10) a certain distance counter to the direction of production (19) during the movement of the die (14; 21; 28); and
   keeping the plastic profile (10) stationary as the die is moved,
   whereby, as a result of the die being moved, a piece of the plastic profile (10) emerges from the die (14; 21; 28) progressively with each working cycle.

4. The process as claimed in claim 2, wherein, during the movement of the die (14; 21; 28) counter to the direction of production (19), a location (17) at which the plastic profile (10) has cured in the die (14; 21; 28) migrates between opposite end regions of the die (14; 21; 28), and the die (14; 21; 28) is moved in relation to the plastic profile (10) when the location (17) at which the plastic profile (10) has cured is located in the region of a rear end (15) of the die (14; 21; 28).

5. The process as claimed in claim 3, wherein the die (14; 21; 28) is moved back in relation to the stationary plastic profile (10), along on the plastic profile (10), until the location (17) at which the plastic profile (10) has cured in the die (14; 21; 28) is located in the region of the front end (18) of the die (14; 21; 28), and flowable liquid plastic is fed to the die (14; 21; 28) at least during the moving back of the die (14; 21; 28) counter to the direction of production (19) of the plastic profile (10).

6. A process for producing a plastic profile (10) comprising a continuous reinforcement (11) comprising strands (13), in which woven fabrics are led through a die (14; 21; 28) and embedded in a plastic (12) in the die (14; 21; 28), wherein
   the die (14; 21; 28) is periodically moved in relation to the stationary plastic profile (10);
   the die (14; 21; 28) is moved on and along the shape of the plastic profile (10);
   during the moving along of the die (14; 21; 28) on the plastic profile (10) that is stationary in relation to the same, the plastic profile (10) is securely held by at least one holding means (20);
   the plastic profile (10) is securely held during the movement of the die (14; 21; 28); and
   in phases in which the die (14; 21; 28) is net stationary, at least one holding means (20; 22, 23) is brought out of contact with the plastic profile (10) and moved in relation to the stationary plastic profile (10) in the direction of the likewise stationary die (14; 21; 28), is moved back counter to the direction of production (19), and, following the movement back of the die (14; 21; 28), the at least one holding means (20; 22, 23) that is not in contact with the plastic profile (10) is moved into the vicinity of the front end (18) of the die (14; 21; 28), in relation to the plastic profile (10) that is stationary as it does so.

7. The process as claimed in claim 6, wherein, to reach a starting position, the die (14; 21; 28), the or each holding means (20; 22, 23) and the plastic profile (10) are moved in the direction of production (19).

8. The process as claimed in claim 1, wherein the die (14; 21; 28) has a changeable curvature and the die (14; 21; 28) is formed into a desired curvature and, during the moving of the die (14; 21; 28), the reinforcement (11) is kept taut within the die (14; 21; 28).

9. A process for producing a plastic profile (10) comprising a continuous reinforcement (11) comprising strands (13), comprising: leading woven fabrics through a ring-shaped die (14; 21; 28); embedding the woven fabrics in a plastic (12) in the die (14; 21; 28) to form the plastic profile (10); periodically moving the die (14; 21; 28) on and along the formed shape of the plastic profile (10); securely holding the plastic profile (10) stationary relative to the die (14; 21; 28) during the movement of the die (14; 21; 28), whereby during the movement of the die (14; 21; 28), the die (14; 21; 28) is moved in relation to the stationary plastic profile (10); and moving the die (14; 21; 28) back and forth discontinuously or step by step during the periodic movement of the die (14; 21; 28), whereby a relative movement of the die (14; 21; 28) in relation to the plastic profile (10) takes place during a backward movement of the die (14; 21; 28) counter to the direction of production (19).

10. A process for producing a plastic profile (10) comprising a continuous reinforcement (11) comprising strands (13), comprising: leading woven fabrics through a ring-shaped die (14; 21; 28); embedding the woven fabrics in a plastic (12) in the die (14; 21; 28) to form the plastic profile (10); periodically moving the die (14; 21; 28) on and along the formed shape of the plastic profile (10); securely holding the plastic profile (10) stationary relative to the die (14; 21; 28) during the movement of the die (14; 21; 28), whereby during the movement of the die (14; 21; 28), the die (14; 21; 28) is moved in relation to the stationary plastic profile (10); and moving the die (14; 21; 28) back on the plastic profile (10) a certain distance counter to the direction of production (19) during the periodic movement of the die (14; 21; 28), whereby, as a result of the die being moved, a piece of the plastic profile (10) emerges from the die (14; 21; 28) progressively with each working cycle.

11. The process as claimed in claim 9, wherein, during the movement of the die (14; 21; 28) counter to the direction of production (19), a location (17) at which the plastic profile (10) has cured in the die (14; 21; 28) migrates between opposite end regions of the die (14; 21; 28), and the die (14; 21; 28) is moved in relation to the plastic profile (10) when the location (17) at which the plastic profile (10) has cured is located in the region of a rear end (15) of the die (14; 21; 28).

12. The process as claimed in claim 10, wherein the die (14; 21; 28) is moved back in relation to the stationary plastic profile (10), along on the plastic profile (10), until the location (17) at which the plastic profile (10) has cured in the die (14; 21; 28) is located in the region of the front end (18) of the die (14; 21; 28), and flowable liquid plastic is fed to the die (14; 21; 28) at least during the moving back of the die (14; 21; 28) counter to the direction of production (19) of the plastic profile (10).

* * * * *

UNITED STATES PATENT AND TRADEMARK OFFICE
CERTIFICATE OF CORRECTION

PATENT NO. : 8,066,922 B2
APPLICATION NO. : 12/296821
DATED : November 29, 2011
INVENTOR(S) : Klaus Jansen, Dietmar Weidler and Marian Hoffmann It is certified that error appears in the above-identified patent and that said Letters Patent is hereby corrected as shown below:

Col. 12, Claim 6 should be changed to:

6. A process for producing a plastic profile (10) comprising a continuous reinforcement (11) comprising strands (13), in which woven fabrics are led through a die (14; 21; 28) and embedded in a plastic (12) in the die (14; 21; 28), wherein the die (14; 21; 28) is periodically moved in relation to the stationary plastic profile (10);

the die (14; 21; 28) is moved on and along the shape of the plastic profile (10);

during the moving along of the die (14; 21; 28) on the plastic profile (10) that is stationary in relation to the same, the plastic profile (10) is securely held by at least one holding means (20);

the plastic profile (10) is securely held during the movement of the die (14; 21; 28); and in phases in which the die (14; 21; 28) is stationary, at least one holding means (20; 22, 23) is brought out of contact with the plastic profile (10) and moved in relation to the stationary plastic profile (10) in the direction of the likewise stationary die (14; 21; 28), is moved back counter to the direction of production (19), and, following the movement back of the die (14; 21; 28), the at least one holding means (20; 22, 23) that is not in contact with the plastic profile (10) is moved into the vicinity of the front end (18) of the die (14; 21; 28), in relation to the plastic profile (10) that is stationary as it does so.

Signed and Sealed this
Twenty-third Day of October, 2012

David J. Kappos
*Director of the United States Patent and Trademark Office*

UNITED STATES PATENT AND TRADEMARK OFFICE
CERTIFICATE OF CORRECTION

PATENT NO. : 8,066,922 B2
APPLICATION NO. : 12/296821
DATED : November 29, 2011
INVENTOR(S) : Klaus Jansen, Dietmar Weidler and Marian Hoffmann Page 1 of 1

It is certified that error appears in the above-identified patent and that said Letters Patent is hereby corrected as shown below:

Col. 12, lines 4-28, Claim 6 should be changed to:

-- 6. A process for producing a plastic profile (10) comprising a continuous reinforcement (11) comprising strands (13), in which woven fabrics are led through a die (14; 21; 28) and embedded in a plastic (12) in the die (14; 21; 28), wherein the die (14; 21; 28) is periodically moved in relation to the stationary plastic profile (10);

the die (14; 21; 28) is moved on and along the shape of the plastic profile (10);

during the moving along of the die (14; 21; 28) on the plastic profile (10) that is stationary in relation to the same, the plastic profile (10) is securely held by at least one holding means (20);

the plastic profile (10) is securely held during the movement of the die (14; 21; 28); and in phases in which the die (14; 21; 28) is stationary, at least one holding means (20; 22, 23) is brought out of contact with the plastic profile (10) and moved in relation to the stationary plastic profile (10) in the direction of the likewise stationary die (14; 21; 28), is moved back counter to the direction of production (19), and, following the movement back of the die (14; 21; 28), the at least one holding means (20; 22, 23) that is not in contact with the plastic profile (10) is moved into the vicinity of the front end (18) of the die (14; 21; 28), in relation to the plastic profile (10) that is stationary as it does so. --

This certificate supersedes the Certificate of Correction issued October 23, 2012.

Signed and Sealed this
Thirteenth Day of November, 2012

David J. Kappos
*Director of the United States Patent and Trademark Office*